(12) United States Patent
Zhou et al.

(10) Patent No.: US 11,500,667 B2
(45) Date of Patent: Nov. 15, 2022

(54) OBJECT-BASED APPROACHES TO SUPPORT INTERNET SMALL COMPUTER SYSTEM INTERFACE (iSCSI) SERVICES IN DISTRIBUTED STORAGE SYSTEM

(71) Applicant: VMware, Inc., Palo Alto, CA (US)

(72) Inventors: Haitao Zhou, Shanghai (CN); Yang Yang, Shanghai (CN); Zhaohui Guo, Shanghai (CN); Jian Zhao, Shanghai (CN); Zhou Huang, Shanghai (CN); Jin Feng, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 273 days.

(21) Appl. No.: 16/820,732

(22) Filed: Mar. 17, 2020

(65) Prior Publication Data

US 2021/0224095 A1  Jul. 22, 2021

(30) Foreign Application Priority Data

Jan. 22, 2020  (WO) ................ PCT/CN2020/073759

(51) Int. Cl.
*G06F 9/455* (2018.01)
*G06F 9/46* (2006.01)
*H04L 67/1097* (2022.01)
*H04L 61/5007* (2022.01)

(52) U.S. Cl.
CPC ...... *G06F 9/45558* (2013.01); *H04L 61/5007* (2022.05); *H04L 67/1097* (2013.01); *G06F 2009/45583* (2013.01); *G06F 2009/45595* (2013.01)

(58) Field of Classification Search
CPC ....... G06F 9/45558; G06F 2009/45583; G06F 2009/45595; H04L 61/2007; H04L 61/1097

USPC ............................................................ 718/1
See application file for complete search history.

(56) References Cited

U.S. PATENT DOCUMENTS

| | | | |
|---|---|---|---|
| 6,757,753 B1 | 6/2004 | DeKoning et al. | |
| 6,915,354 B1 | 7/2005 | Ozdemir et al. | |
| 7,325,097 B1 | 1/2008 | Darcy | |
| 7,460,473 B1 | 12/2008 | Kodama et al. | |
| 7,464,222 B2 | 12/2008 | Matsunami et al. | |

(Continued)

FOREIGN PATENT DOCUMENTS

CN   106850877 A   *   6/2017

OTHER PUBLICATIONS

English Translation of CN-106850877-A (Year: 2017).*

(Continued)

*Primary Examiner* — Bradley A Teets
(74) *Attorney, Agent, or Firm* — SU IP Consulting

(57) ABSTRACT

One example method to support Internet small computer system interface (iSCSI) services in a distributed storage system of a virtualization system may include receiving a notification of a change event associated with a global virtual Internet Protocol (VIP) object, wherein the global VIP object is associated with a virtual IP address for the iSCSI services. The method may also include in response to a first determination that the first host machine does not own the global VIP object and in response to a second determination that the first host machine gains ownership of the global VIP object based on the notification, locking the global VIP object and binding the virtual IP address to the first host machine.

21 Claims, 9 Drawing Sheets

(56) References Cited

U.S. PATENT DOCUMENTS

| | | |
|---|---|---|
| 7,519,769 B1 | 4/2009 | Kulkarni et al. |
| 7,664,883 B2 | 2/2010 | Craft et al. |
| 7,698,424 B1 | 4/2010 | Clark et al. |
| 7,730,221 B2 | 6/2010 | Diamant et al. |
| 7,843,907 B1 | 11/2010 | Abou-Emara et al. |
| 7,843,931 B1 | 11/2010 | Anker et al. |
| 7,870,317 B2 | 1/2011 | Suresh |
| 7,873,700 B2 | 1/2011 | Pawlowski et al. |
| 7,990,994 B1 | 8/2011 | Yeh et al. |
| 7,991,783 B2 | 8/2011 | Flynn, Jr. et al. |
| 8,127,093 B2 | 2/2012 | Asano et al. |
| 8,452,856 B1 * | 5/2013 | Lent ................ G06F 3/0647 709/219 |
| 8,504,693 B2 | 8/2013 | Khosravi et al. |
| 8,863,124 B1 | 10/2014 | Aron |
| 8,976,704 B2 | 3/2015 | Morper |
| 9,116,624 B2 | 8/2015 | Canepa et al. |
| 9,225,801 B1 * | 12/2015 | McMullen .......... H04L 61/2007 |
| 9,256,475 B1 * | 2/2016 | Aron .................. G06F 3/0638 |
| 9,537,827 B1 * | 1/2017 | McMullen .......... H04L 63/0272 |
| 9,830,082 B1 | 11/2017 | Srinivasan et al. |
| 9,946,569 B1 | 4/2018 | Beedu et al. |
| 2003/0084209 A1 | 5/2003 | Chadalapaka |
| 2003/0115447 A1 | 6/2003 | Pham et al. |
| 2003/0177174 A1 | 9/2003 | Allen et al. |
| 2004/0143640 A1 | 7/2004 | Rangan et al. |
| 2004/0260768 A1 | 12/2004 | Mizuno |
| 2005/0091333 A1 | 4/2005 | Kobayashi et al. |
| 2005/0144404 A1 | 6/2005 | Nashimoto et al. |
| 2005/0210144 A1 | 9/2005 | Kumagai et al. |
| 2006/0020664 A1 | 1/2006 | Umeda |
| 2010/0003693 A1 | 1/2010 | Cunningham et al. |
| 2010/0030910 A1 | 2/2010 | Pong |
| 2010/0036932 A1 | 2/2010 | Ogata et al. |
| 2010/0161843 A1 | 6/2010 | Spry |
| 2011/0246734 A1 | 10/2011 | Umbehocker |
| 2012/0303810 A1 | 11/2012 | Kotha et al. |
| 2012/0324071 A1 | 12/2012 | Gulati et al. |
| 2013/0007741 A1 | 1/2013 | Britsch et al. |
| 2014/0289463 A1 | 9/2014 | Carl |
| 2015/0117199 A1 | 4/2015 | Chinnaiah Sankaran et al. |
| 2015/0172104 A1 | 6/2015 | Brandwine |
| 2016/0103699 A1 | 4/2016 | Thakkar et al. |
| 2016/0162371 A1 * | 6/2016 | Prabhu ................ G06F 3/065 707/654 |
| 2016/0357692 A1 | 12/2016 | Lu et al. |
| 2016/0359955 A1 | 12/2016 | Gill et al. |
| 2017/0235654 A1 | 8/2017 | Deshmukh et al. |
| 2017/0235764 A1 | 8/2017 | Sharpe et al. |
| 2018/0136957 A1 * | 5/2018 | Guo .................... H04L 63/0428 |
| 2018/0287951 A1 * | 10/2018 | Waskiewicz, Jr ..... H04L 67/327 |
| 2020/0026446 A1 | 1/2020 | Jawahar et al. |
| 2021/0224096 A1 | 7/2021 | Zhou et al. |

OTHER PUBLICATIONS

"ISCSI (Internet Small Computer System Interface)", Searchstorage.com, http://searchstorage.techtarget.com/definition/iSCSI, Oct. 20, 2014, 3 pages.

Jonghoon (Jason) Jeong, "iSCSI SAN Topologies", EMC2 Techbooks, EMC Corporation, http://www.emc.com/collateral/hardware/technical-documentation/h8080-iscsi-san-topologies.pdf, Copyright 2011-2015, 192 pages.

"NetApp iSCSI Features/Benefits", NetApp, http://www.netapp.com/us/products/protocols/iscsi/features.aspx, Jan. 2106 [retrieved Feb. 1, 2017], 3 pages.

Steven Poitras, "The Nutanix Bible", nutanixbible.com, Copyright 2016, 164 pages.

Scale Computing, "Scale Computing Storage Cluster User Guide", https://scalecomputing.com/files/documentation/userguide-2.3.3.pdf, Jan. 2016 [retrieved Feb. 1, 2017], 116 pages, San Mateo, CA.

Hans De Leenheer et al, "Deep Dive on SimpliVity's OmniStack", http://www.nu.co.za/images/SimpliVity/Whitepapers/omnicube_technical_deep_dive.pdf, Aug. 2013, 10 pages.

Brian Suhr, "Hyper-Converged Infrastructure comparison, Nutanix vs SimpliVity vs EVO:RAIL", www.datacenterzombie.com, Oct. 2014, 11 pages.

J. Satran et al, "Internet Small Computer Systems Interface (iSCSI)", www.ietf.org/rfc/rfc3720.txt, Apr. 2004, 222 pages.

George Penokie, Information Technology—SCSI Architecture Model—4 (SAM-4), INCITS, Nov. 21, 2007, 149 pages.

Ralph O. Weber, Information Technology—SCSI Primary Commands—4 (SPC-4), INCITS, Jul. 29, 2008, 740 pages.

Lee Duncan, "A Tutoria on SCSI-3 Persistent Group Reservations", SUSE Labs, Dec. 2012, 11 pages.

Edward Tomasz Napierala, "Native iSCSI target", FreeBSD Handbook, May 17, 2014, 1 page.

Freebsd, "28.12. iSCSI Initiator and Target Configuration", FreeBSD Handbook, Jan. 2016 [retrieved Mar. 21, 2017], 5 pages.

Microsoft, "Multipath I/O Overview", Microsoft TechNet, Jun. 2015 [retrieved Mar. 21, 2017], 6 pages.

JENS AXBOE, "FIO", Free(code), Jun. 2014, 1 page.

* cited by examiner

OBJECT-BASED APPROACHES TO SUPPORT INTERNET SMALL COMPUTER SYSTEM INTERFACE (ISCSI) SERVICES IN DISTRIBUTED STORAGE SYSTEM

CROSS-REFERENCE TO RELATED APPLICATION

The present application claims the benefit of Patent Cooperation Treaty (PCT) Application No. PCT/CN2020/073759, filed Jan. 22, 2020. The present application is also related to U.S. patent application Ser. No. 16/820,735, filed Mar. 17, 2020.

BACKGROUND

Virtualization software for implementing and managing virtual infrastructure objects may include (1) hypervisor software that implements virtual machines (VMs) on physical hosts, (2) virtual storage area network (vSAN) that aggregates local storage to form a shared datastore for a cluster of hosts, and (3) a management server that centrally provisions and manages virtual datacenters, VMs, hosts, clusters, datastores, and virtual networks. The vSAN software may be implemented as part of the hypervisor software.

The vSAN software uses the concept of a disk group as a container for solid-state drives (SSDs) and non-SSDs, such as hard disk drives (HDDs). On each host (node) in a vSAN cluster, the local drives are organized into one or more disk groups. Each disk group includes one SSD that serves as read cache and write buffer (e.g., a cache tier), and one or more SSDs or non-SSDs that serve as permanent storage (e.g., a capacity tier). The aggregate of the disk groups from all the nodes form a vSAN datastore distributed and shared across the nodes.

The vSAN software stores and manages data in the form of data containers called objects. An object is a logical volume that has its data and metadata distributed across a vSAN cluster. For example, every virtual machine disk (VMDK) is an object, as is every snapshot. For namespace objects, the vSAN software leverages virtual machine file system (VMFS) as the file system to store files within the namespace objects. A virtual machine (VM) is provisioned on a vSAN datastore as a VM home namespace object, which stores metadata files of the VM including descriptor files for the VM's VMDKs.

vSAN introduces a converged storage-compute platform where VMs are running on hosts as usual while a small percentage of CPU and memory resources is used to serve the storage needs of the same VMs. vSAN enables administrators to specify storage attributes, such as capacity, performance, and availability, in the form of simple policies on a per-VM basis. vSAN offers many advantages over traditional storage, including scalability, simplicity, and lower total cost of ownership.

Internet small computer system interface (iSCSI) is a transport layer protocol that describes how small computer system interface (SCSI) packets are transported over a transmission control protocol/Internet protocol (TCP/IP) network. vSAN iSCSI target (VIT) service allows hosts and physical workloads that reside outside a vSAN cluster to access a vSAN datastore. VIT service enables an iSCSI initiator on a remote host to transport block-level data to an iSCSI target on a storage device in the vSAN cluster. After enabling and configuring VIT service on the vSAN cluster, a user can discover iSCSI targets from the remote host using various approaches.

DETAILED DESCRIPTION

Figure 1A:
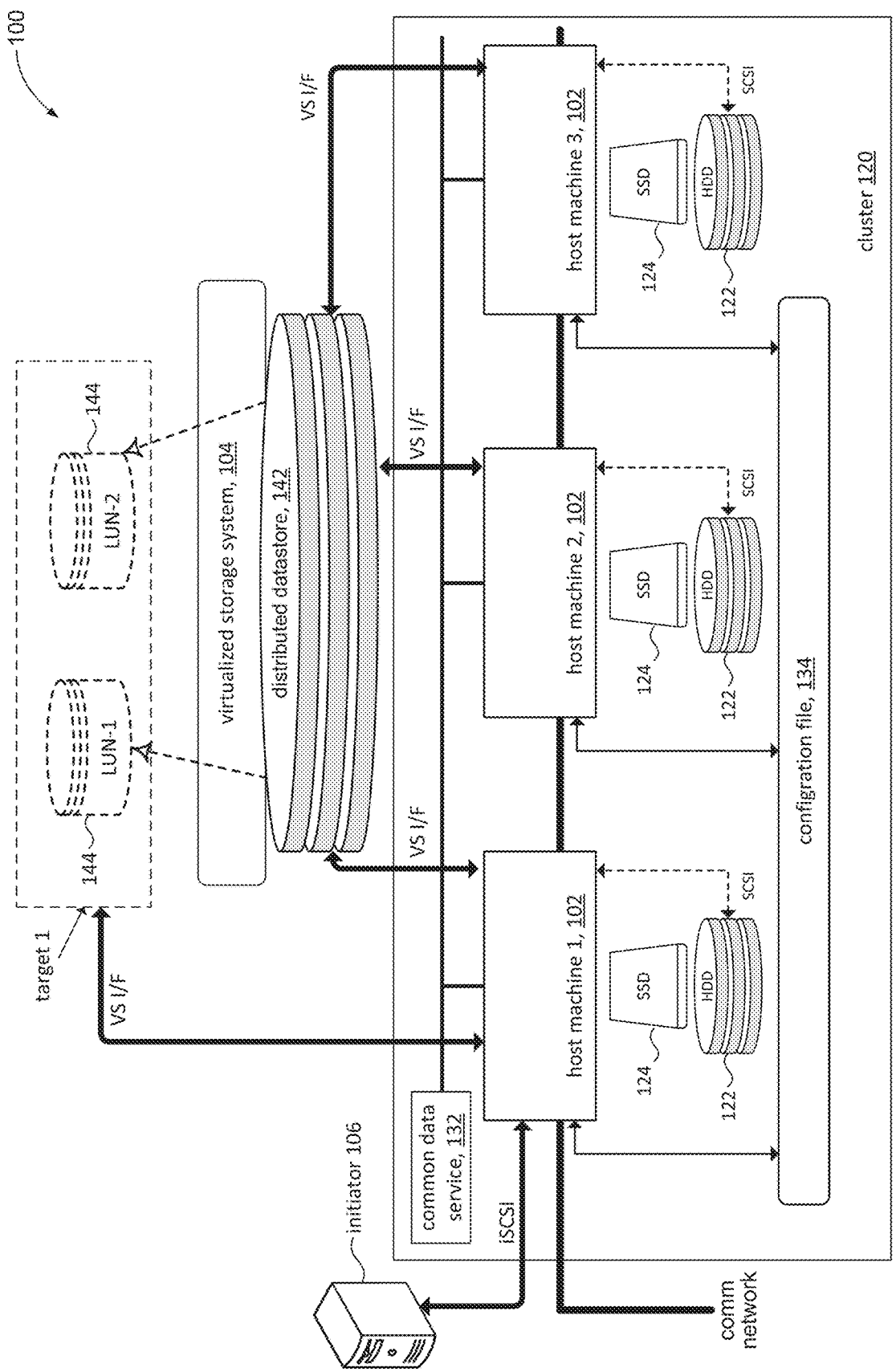
FIG. 1A illustrates an example of a virtualization system with virtual storage area network (vSAN) support.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

To support virtual storage area network (vSAN) Internet small computer system interface (iSCSI) target services, the following components are generally involved: (1) target, (2) distributed storage device, (3) discovery node (DN), and (4) storage node (SN).

A target can be a container for one or more distributed storage devices, which are typically identified using logical unit numbers (LUNs). In some instances and throughout the following paragraphs, the term "LUN" can also refer to the distributed storage device itself. An initiator connects to a target via an owner of the target and then accesses the LUNs in the target.

A DN is a host that can act as a discovery portal for iSCSI services that an initiator may access to discover available targets.

A SN is a host that can process iSCSI input/outputs (I/Os) to the LUNs within a target. Typically, a SN is also the owner of the target that it can access.

FIG. 1A illustrates an example of virtualization system 100 with vSAN support. The underlying hardware that comprises virtualization system 100 may include host machines 102 in cluster 120 and a communication network (e.g., LAN, WAN, not shown) to interconnect host machines 102. Although FIG. 1A illustrates three host machines 102 in cluster 120, it will be appreciated that the cluster may include additional (or fewer) host machines 102. Throughout this disclosure, the terms "host machine" and "nodes" are used interchangeably.

Each host machine 102 (e.g., host machine 1, 2, or 3) may include one or more hard disk drives (HDDs) 122 connected to host machine 102. In some embodiments, hard disk drives 122 may be configured according to the SCSI (Small Computer System Interface) protocol, and each host 102 may communicate with its local hard disk drives 122 using the SCSI protocol. Each host machine 102 may also include solid state drive or disk (SSD) 124. Each host machine 102 may be configured with a hypervisor (shown in later figures), also referred to as a virtual machine monitor (VMM). The hypervisor may be a combination of computer software, firmware, and/or hardware that supports the execution of virtual machines (VMs, not shown).

Virtualization system 100 may include virtualized storage system 104 that provides virtual distributed datastore 142. Distributed datastore 142 may include an aggregation of hard disk drives 122 and solid state drives 124 respectively connected to host machines 102. In some embodiments, hard disk drives 122 may be used to provide persistent storage in distributed datastore 142, while solid state drives 124 may serve as read and write caches for data I/O operations. The VMs deployed on host machines 102 may access distributed datastore 142 via a virtual storage interface (VS I/F) comprising commands and protocols defined by virtual storage system 104.

Virtualized storage system 104 may allocate storage from the distributed datastore 142 to define distributed storage devices 144 (also referred to as virtual disks). Distributed storage devices 144 may include all or part of hard disk drives 122 connected to host machines 102 in cluster 120, and hard disk drives 122 may include SCSI-based storage devices that provide block-based storage of data. To illustrate, target 1 includes distributed storage devices 144 corresponding to LUN-1 and LUN-2, and LUN-1 and LUN-2 are shown to be supported by at least a portion of the storage area on hard disk drives 122 connected to host machine 1, host machine 2, and host machine 3.

As an illustration, host machine 1 in FIG. 1A is both a DN and a SN for cluster 120, and host machine 1 is the owner of target 1. Initiator 106, which may be a computer system that is separate from the host machines in cluster 120, obtains the Internet Protocol (IP) address of host machine 1 and performs a login/authentication/target discovery sequence with host machine 1. After successfully completing the sequence and ensuring that host machine 1 is indeed the owner of target 1, initiator 106 may then perform iSCSI-based Input/Output (I/O) operations to access the LUNs in target 1 via host machine 1. Virtualization system 100 may include infrastructure to support iSCSI processing by host machines 102 in cluster 120. In some embodiments, the infrastructure may include common data service 132 and configuration file 134 to store and communicate configuration data used by host machines 102 in cluster 120 to support iSCSI processing. Common data service 132 may have access to an in-memory key-value datastore (not shown in FIG. 1A), which in some embodiments, mainly relies on the main memory of host machines 102 in cluster 120, as opposed to the storage devices accessible to the host machines. In addition, when information is stored in this in-memory key-value datastore, the information is also replicated in host machines 102 in cluster 120. Thus, any queries made to this datastore is a local operation and is efficient.

Figure 1B:
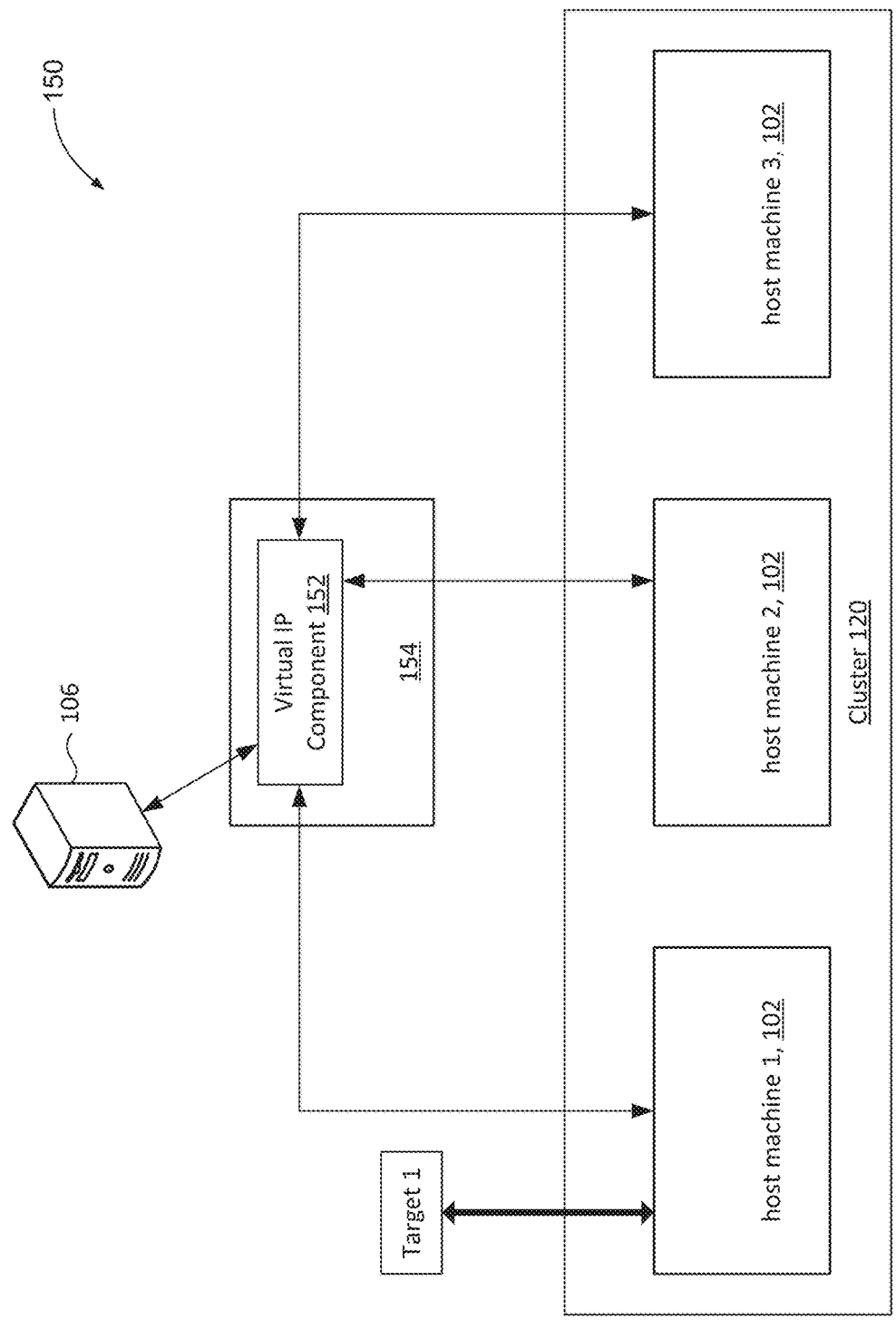
FIG. 1B is a simplified representation of a virtualization system that supports the use of a virtual IP component for Internet small computer system interface (iSCSI) communications.

FIG. 1B is a simplified representation of virtualization system 150 that supports the use of virtual IP component 152 for iSCSI communications. Virtualization system 150 has the same cluster 120 as virtualization system 100 of FIG. 1A, but it relies on host machine 154, which is external to cluster 120 and executes virtual IP component 152, to support iSCSI communications. Specifically, instead of obtaining the IP address of host machine 102, initiator 106 obtains a virtual IP address exported by virtual IP component 152. As initiator 106 performs a login/authentication/target discovery sequence using this virtual IP address, virtual IP component 152 communicates with host machines 102 in cluster 120 to identify the owner of the target that the initiator 106 is configured to access (e.g., target 1). After the login/authentication/target discovery sequence is successfully completed, initiator 106 may then perform iSCSI-based I/O operations to access the LUNs in target 1. Although communicating with a static virtual IP, as opposed to a potentially-changing physical IP address of a host machine, may be convenient for initiators, host machine 154 needs to support mechanisms to ensure high availability by generating and activating backup virtual IP components in the event virtual IP component 152 fails. Generating and activating backup virtual IP components can introduce non-trivial down time for iSCSI data services, which may be unacceptable to real-time applications that rely on such iSCSI data services.

In addition, Virtual IP component 152 in virtualization system 150 may also perform workload balancing on the iSCSI traffic from the IP layer across all the host machines in cluster 120. When there are heavy iSCSI-based I/O operations between initiator 106 and host machines 102 in cluster 120 or when cluster 120 scales out to include many more host machines, virtual IP component 152 becomes a bottleneck, negatively impacting the performance relating to the iSCSI services in cluster 120.

Figure 2:
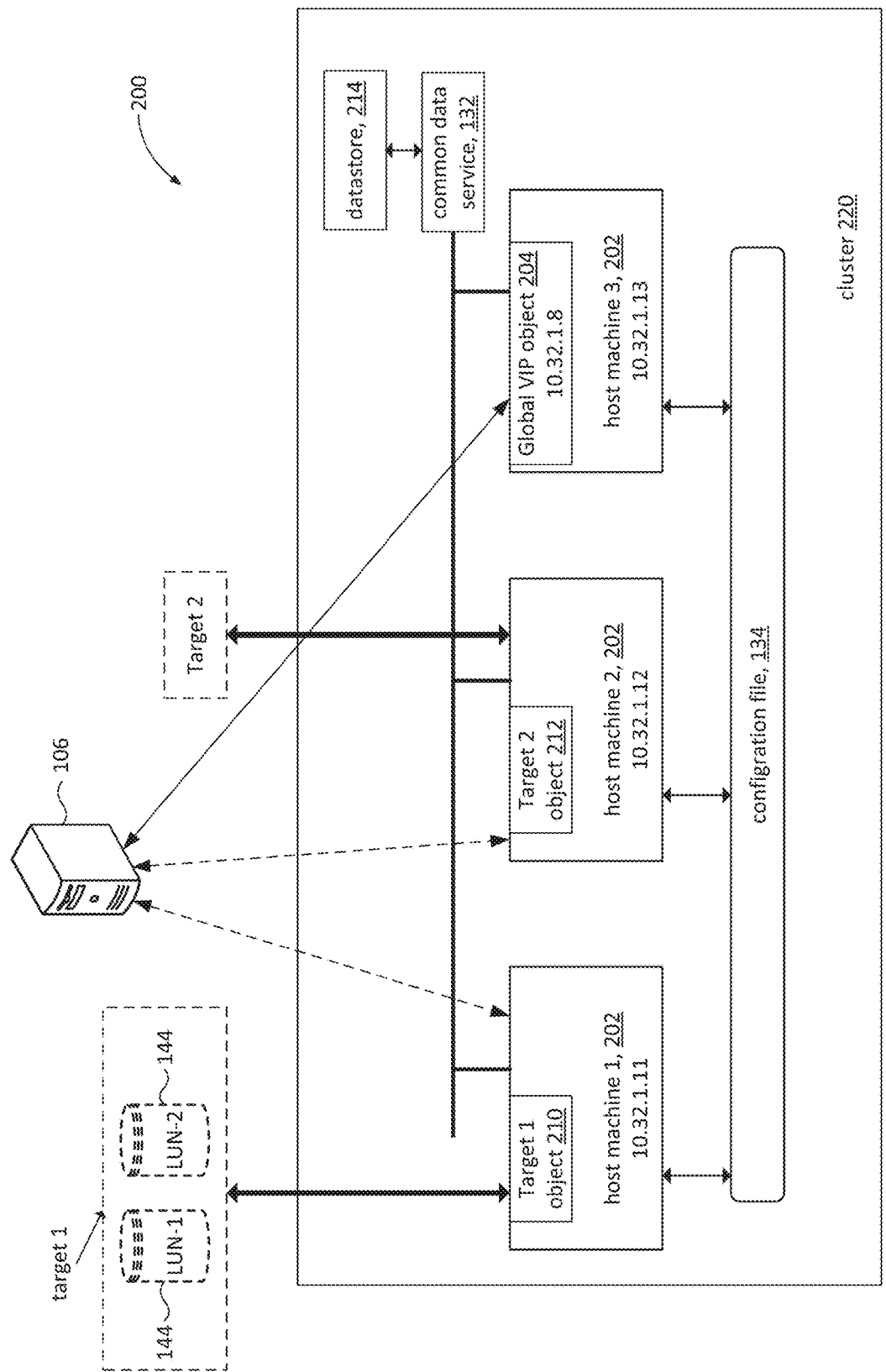
FIG. 2 is a simplified representation of a virtualization system that supports a global virtual Internet Protocol (VIP) object, in accordance with some embodiments of the present disclosure.

FIG. 2 is a simplified representation of virtualization system 200 that supports global virtual Internet Protocol (VIP) object 204, in accordance with some embodiments of the present disclosure. Similar to virtualization system 100 of FIG. 1A, virtualization system 200 includes cluster 220 with a number of host machines 202 and a virtualized storage system (not shown). To support iSCSI processing, like virtualization system 100, virtualization system 200 also includes common data service 132 and configuration file 134 to store and communicate configuration data used by host machines 202 in cluster 220.

In some embodiments, common data service 132 is a mechanism to deliver notifications among host machines 202 in cluster 220. Each host machine may subscribe to common data service 132. As discussed earlier, common data service 132 may have access to in-memory key-value datastore 214 to maintain a list of subscribed host machines 202 and also owners of iSCSI targets. Any host machine 202 may announce changes to cluster 220 and update configuration file 134 to reflect the changes, and common data service 132 may notify subscribed host machines 202 of the changes. Configuration file 134 may include information relating to an iSCSI target, such as, without limitation, its LUNs, the size of the LUNs, the status of the LUNs (e.g., online and offline), its universally unique identifier (UUID), etc.

In some embodiments, virtualization system 200 may manage distributed storage devices 144 as objects. Each target object (e.g., target 1 object 210 and target 2 object 212 as illustrated in FIG. 2) may be associated with an iSCSI target and may include descriptor files that contain information for one or more distributed storage devices 144 that constitute the target. For example, target 1 object 210 may include descriptor files containing respective descriptive information for two virtual disk objects called LUN1-UUID.vmk and LUN2-UUID.vmdk corresponding to LUN-1 and LUN-2 in target 1, respectively.

Global VIP object 204, on the other hand, may serve as a high level namespace object for cluster 220. Global IP object 204 may contain a nested hierarchy of target objects mentioned above. Example high level namespace objects and their relations with other objects are illustrated and described in the commonly-owned U.S. patent application Ser. No. 15/350,027, filed Nov. 12, 2016, which is incorporated by reference in its entirety.

Unlike virtual IP component 152 of FIG. 1B, which resides in host machine 154 external to cluster 120, global VIP object 204 resides in one of host machines 202 in cluster 220 (e.g., host machine 3). In some embodiments, host machine 3 with the IP address of 10.32.1.13 is the owner of global VIP object 204. Thus, the virtual IP address (e.g., 10.32.1.8) associated with global VIP object 204 is bound to host machine 3. To access any target via a host machine in cluster 220, initiator 106 establishes an iSCSI connection using the virtual IP address of 10.32.1.8. In some embodiments, this virtual IP address is stored in configuration file 134 and kept as part of global VIP object 204.

Suppose host machine 1 in cluster 220 is the owner of target 1. Suppose further that all three host machines shown in cluster 220 of FIG. 2 have subscribed to common data service 132. After initiator 106 first connects with global IP object 204, initiator 106 learns about the available targets that can be accessed via the host machines in cluster 220 (e.g., target 1 and target 2 as shown in FIG. 2). Suppose initiator 106 is interested to access target 1 and connects with global IP object 204 requesting access for target 1. Then, host machine 3 retrieves information associated with the owner of target 1 (e.g., host machine 1 and its IP address of 10.32.1.11) from common data service 132 and responds to initiator 106 and essentially redirects initiator 106 to connect with host machine 1.

After initiator 106 successfully completes the login/authentication/target discovery sequence with host machine 1 via 10.32.1.11, initiator 106 can conduct iSCSI-based I/O operations with target 1 via host machine 1.

Setting up a Global VIP Object

Figure 3:
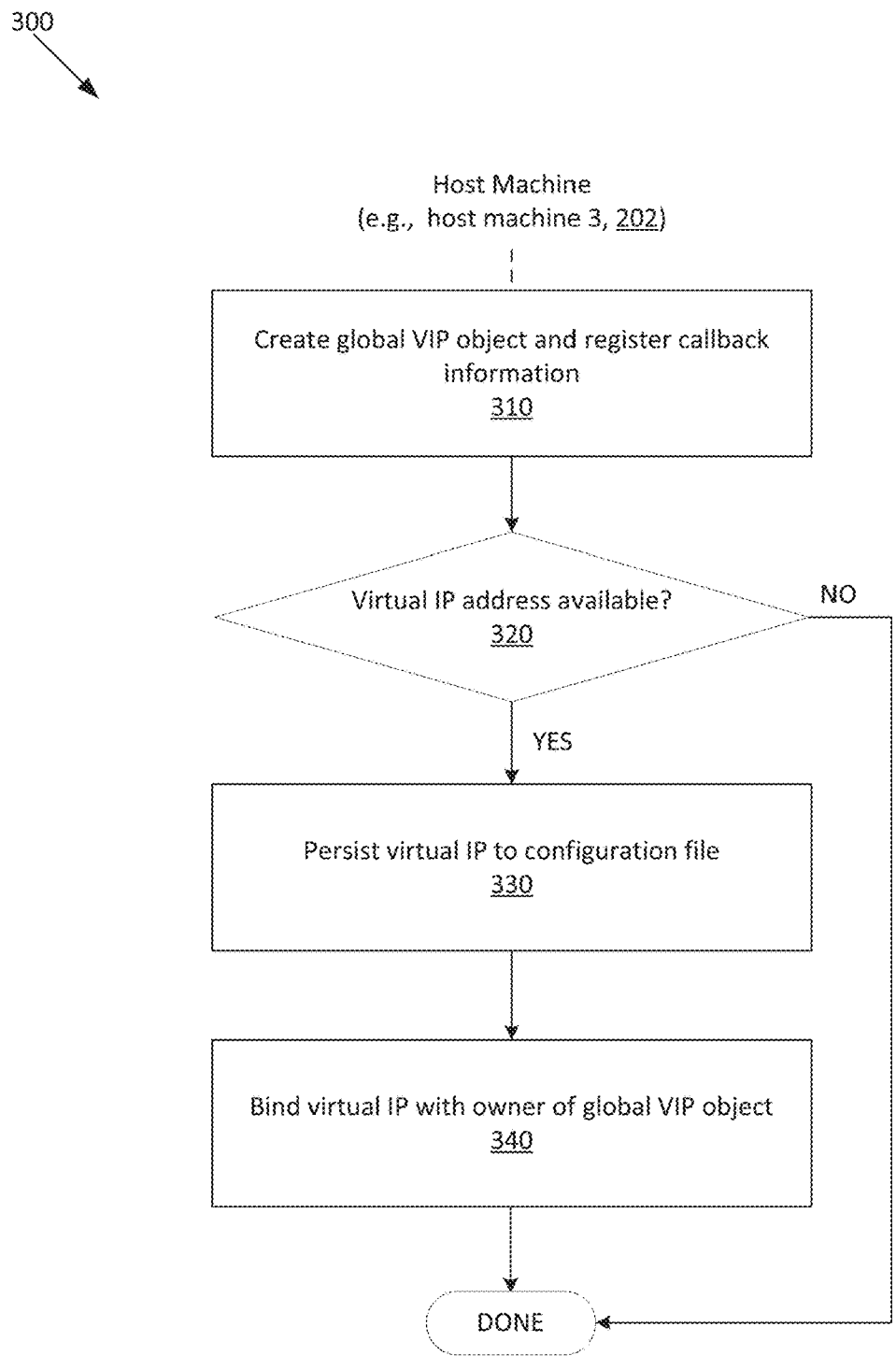
FIG. 3 illustrates a flowchart of an example process for a host machine in a cluster to set up a global VIP object, in accordance with some embodiments of the present disclosure.

FIG. 3 illustrates a flowchart of example process 300 for a host machine in a cluster to set up a global VIP object, in accordance with some embodiments of the present disclosure. Example process 300 may include one or more operations, functions, or actions illustrated by one or more blocks, such as 310 to 340. The various blocks may be combined into fewer blocks, divided into additional blocks, and/or eliminated depending on the desired implementation.

Using host machine 3 in cluster 220 of FIG. 2 as an illustration, when enabling iSCSI services, at block 310, host machine 3 creates global VIP object 204 for cluster 220 and registers change callback information (e.g., callback ID for global VIP object 204) with common data service 132. In some embodiments, this registration ensures that a change event associated global VIP object 204 (e.g., the owner of the object changes) will be monitored by common data service 132. In other words, in response to the receipt of such a registered change event, common data service 132 notifies all the host machines subscribed to common data service 132. Process 300 proceeds to block 320.

At block 320, host machine 3 checks to see if any virtual IP address is available for global VIP object 204. In some embodiments, host machine 3 may receive the virtual IP address from an administrator. If there is an available virtual IP address, then process 300 proceeds to block 330. Otherwise, process 300 ends.

At block 330, host machine 3 persists the virtual IP address to configuration file 134. Persisting data to configuration file 134 generally refers to writing data to the physical resources (e.g., disks) underlying configuration file 134, irrespective of whether any virtual infrastructure objects associated with configuration file 134 is powered off or reset. Process 300 proceeds to block 340.

At block 340, host machine 3 binds the virtual IP address to the owner of global VIP object 204. In this case, the owner is host machine 3.

Maintaining High Availability of a Global VIP Object

In contrast to the mechanisms to maintain high availability for virtual IP component 152 of FIG. 1B, by using global VIP object 204, configuration file 134, common data service 132, and the requirement of only one owner of global VIP object 204 in cluster 220, an efficient failover mechanism is feasible and is described below in conjunction with FIG. 4.

Figure 4:
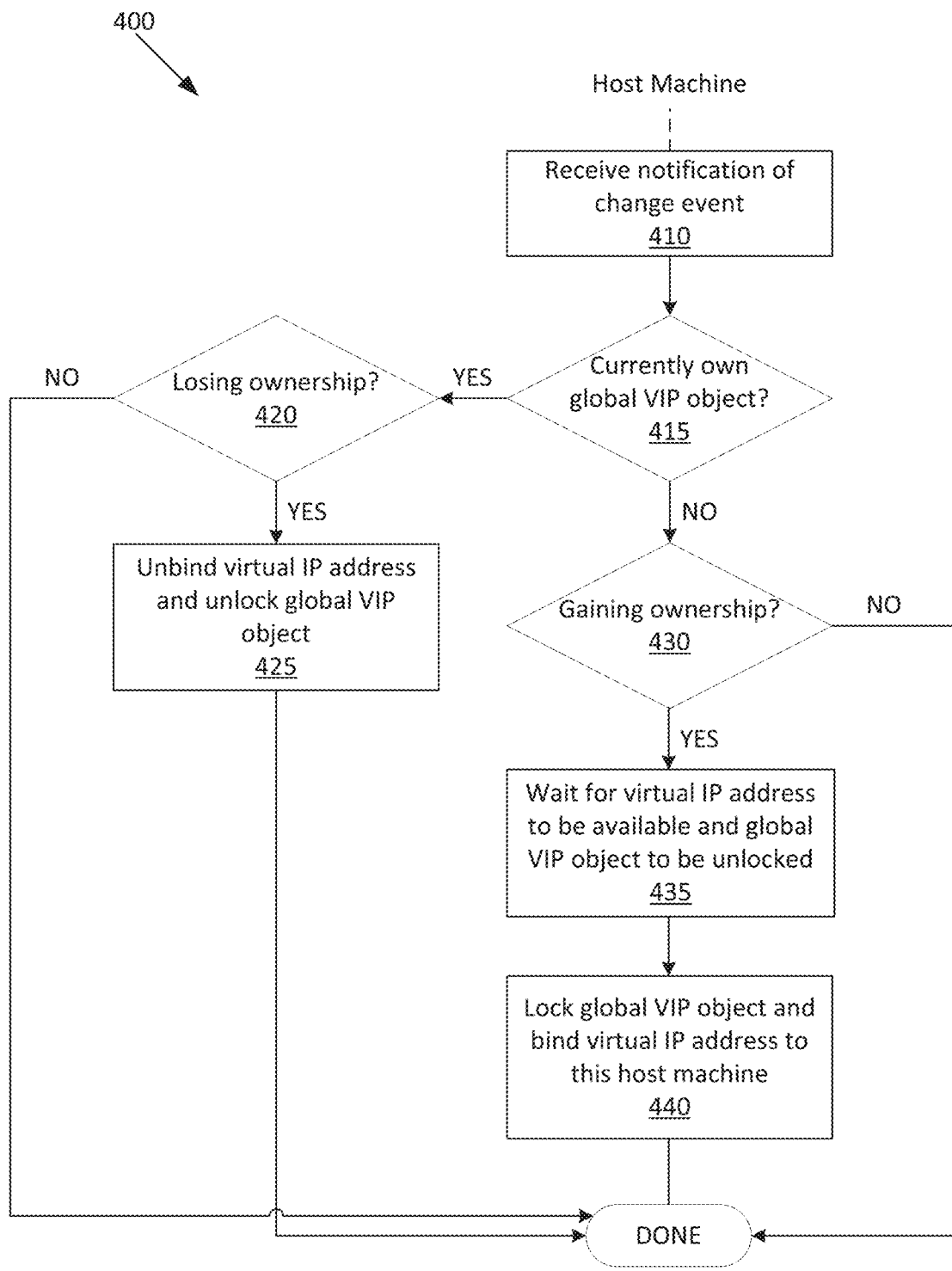
FIG. 4 illustrates a flowchart of an example process for a host machine in a cluster to handle an owner change event, in accordance with some embodiments of the present disclosure.

FIG. 4 illustrates a flowchart of example process 400 for a host machine in a cluster to handle an owner change event, in accordance with some embodiments of the present disclosure. Example process 400 may include one or more operations, functions, or actions illustrated by one or more blocks, such as 410 to 440. The various blocks may be combined into fewer blocks, divided into additional blocks, and/or eliminated depending on the desired implementation.

Continuing with the example illustrated in FIG. 2, the owner of global VIP object 204 may change in various situations. Some examples include, without limitation, host machine 3 may fail, move to maintenance mode, or power off. To ensure continuous availability of global VIP object 204, the object may need to be moved to another host machine in cluster 220.

For illustration purposes, suppose all three host machines shown in FIG. 2 subscribe to common data service 132, host machine 3 in cluster 220 is the current owner of global VIP object 204, and host machine 2 in cluster 220 is the intended new owner of the object. Process 400 is described from the perspectives of host machine 2 and host machine 3 in subsequent paragraphs.

From the Perspective of Host Machine 3

At block 410, host machine 3 in cluster 220 receives the notification of a change event, i.e., the ownership change for global VIP object 204, from common data service 132. As discussed earlier in conjunction with FIG. 3, common data service 132 generates this notification, because callback registration has been performed. Process 400 proceeds to block 415.

At block 415, host machine 3 determines whether it currently owns global VIP object 204 by checking with common data service 132. Since host machine 3 is indeed the current owner, host machine 3 determines whether the received notification indicates losing ownership of global VIP object 204 for host machine 3 at block 420. If so, then process 400 proceeds to block 425. On the other hand, if host machine 3 is not losing ownership of global VIP object 204, then process 400 terminates.

At block 425, host machine 3 unbinds the virtual IP address and unlocks global VIP object 204. A distributed lock mechanism (e.g., Virtual Machine File System lock for vSAN) may be utilized.

From the Perspective of Host Machine 2

At block 410, host machine 2 receives the notification of a change event, i.e., the ownership change for global VIP object 204, from common data service 132.

At block 415, host machine 2 determines whether it currently owns global VIP object 204 by checking with common data service 132. Since host machine 2 is not the owner, host machine 2 determines whether the received notification indicates gaining ownership of global VIP object 204 for host machine 2 at block 430. If so, then process 400 proceeds to block 435. On the other hand, if host machine 2 is not gaining ownership of global VIP object 204, then process 400 terminates.

At block 435, host machine 2 checks configuration file 134 to see whether the virtual IP address is available and waits for it to be available. Host machine 2 also waits for global VIP object 204 to be unlocked. In some embodiments, the virtual IP address becomes available when the current owner of global VIP object 204, e.g., host machine 3, unbinds the virtual IP address from the current owner itself. Host machine 2 may also check whether the current owner has unlocked global VIP object 204. This lock mechanism may help to prevent host machine 2 from solely relying on the information in configuration file 134, especially in situations where host machine 3 unexpectedly fails, failing to update configuration file 134. After block 435, process 400 proceeds to block 440.

At block 440, host machine 2 locks global VIP object 204 and also binds the virtual IP address to itself. In some embodiments, host machine 2 also communicates its ownership of global VIP object 204 to common data service 132. Common data service 132 may keep this ownership information in its datastore (e.g., datastore 214 as shown in FIG. 2).

Object-Based Load Balancing

In contrast to the load balancing for iSCSI traffic from the IP layer by virtual IP component 152 of FIG. 1B, each of the host machines in a cluster employs an object-based load balancing approach. Specifically, this object-based approach utilizes measurable quantities of iSCSI objects (e.g., number of host machines or nodes, number of targets, number of LUNs).

Figure 5:
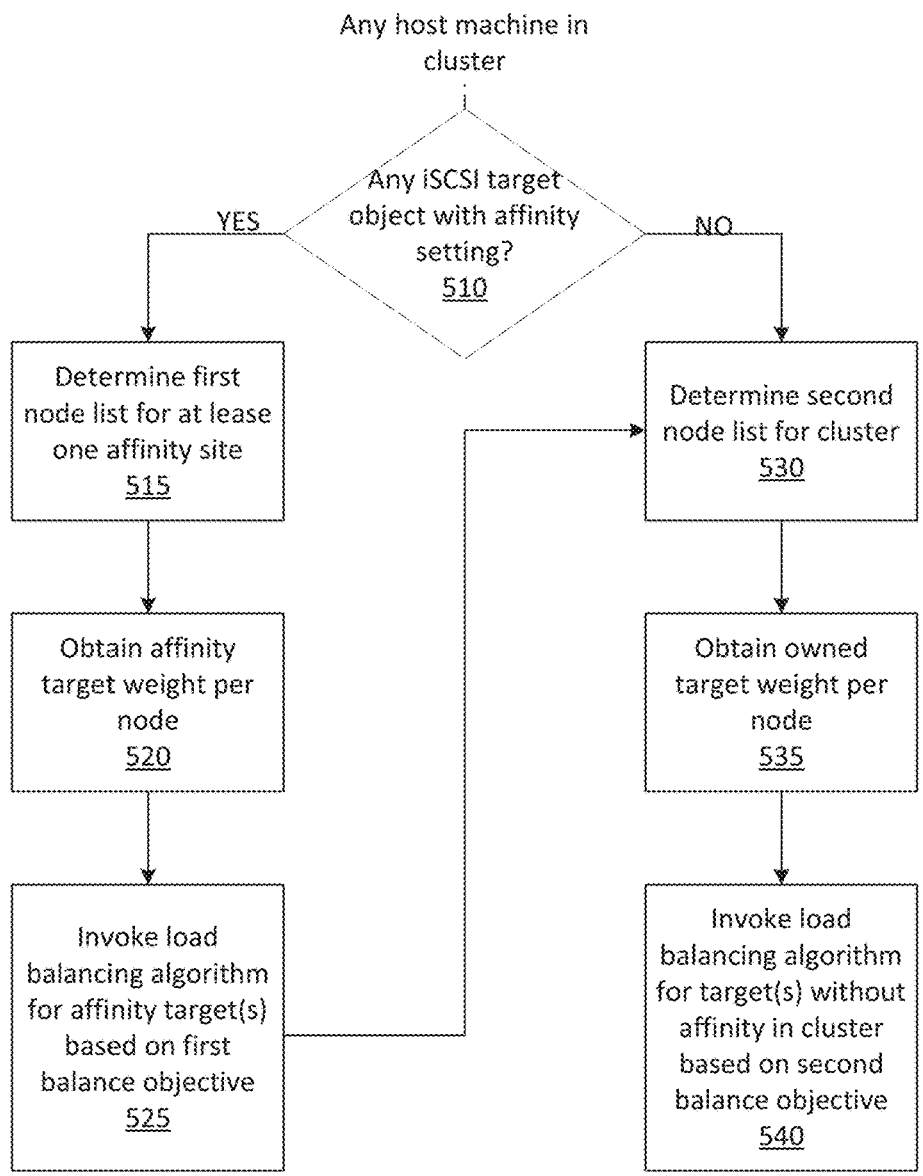
FIG. 5 illustrates a flowchart of an example process for a host machine in a cluster to balance workload, in accordance with some embodiments of the present disclosure.

FIG. 5 illustrates a flowchart of example process 500 for a host machine in a cluster to balance workload, in accordance with some embodiments of the present disclosure. Example process 500 may include one or more operations, functions, or actions illustrated by one or more blocks, such as 510 to 540. The various blocks may be combined into fewer blocks, divided into additional blocks, and/or eliminated depending on the desired implementation.

In some embodiments, a load balancing thread executing on a host machine in a cluster may be configured to perform process 500, and each host machine in the cluster may execute its own load balancing thread. Referring to cluster 220 of FIG. 2, each of the host machines in cluster 220 may update its target related information in configuration file 134 and also retrieve target related information of other host machines in cluster 220 from configuration file 134 and common data service 132.

At block 510, the host machine determines whether there are any iSCSI target objects in the cluster with affinity settings? If so, then the iSCSI target objects with such settings have relationships with one another (e.g., the iSCSI target objects with affinity to a particular site in a cluster), and process 500 proceeds to block 515.

At block 515, the host machine determines a first node list for at least one affinity site. In other words, the host machine identifies all the host machines, or nodes, owning the iSCSI target objects with affinity to one or more affinity sites and places the identified nodes in a first node list. Process 500 proceeds to block 520.

At block 520, for each of the nodes determined at block 515, the host machine also obtains a target weight. In one example, the target weight may be a numerical count of affinity targets. An affinity target broadly refers to a target that a node in the affinity site owns. In some embodiments, with the first node list and the numerical count of affinity targets, a mapping between each node and its owned affinity targets may be generated. Such a mapping may be used for sorting purposes. Process 500 proceeds to block 525.

At block 525, with the determined nodes in the affinity site and the number of affinity targets per node, the host machine invokes a load balancing algorithm based on a first balance objective for the affinity targets. In some embodiments, the first balance objective may be that each node in the affinity site handles the same or close to the same number of affinity targets. Process 500 proceeds to block 530.

If the host machine determines at block 510 that there are no iSCSI objects in the cluster with affinity settings, then process 500 also proceeds to block 530.

At block 530, host machine determines a second node list for the cluster. In some embodiments, the second node list includes all the nodes that are in the cluster.

At block 535, for each of the nodes determined at 530, the host machine obtains a target weight (e.g., a numerical count of the targets without affinity) owned by the node.

At block 540, the host machine invokes a load balancing algorithm based on a second balance objective for the targets without affinity in the cluster. Similar to block 520, in some embodiments, with the second node list and the numerical count of targets without affinity owned by each of the nodes, a mapping between each node and its owned targets without affinity may be generated. Such a mapping may also be used for sorting purposes. In some embodiments, the balance objective may be that each node in the cluster handles the same or close to the same number of targets without affinity.

Figure 6:
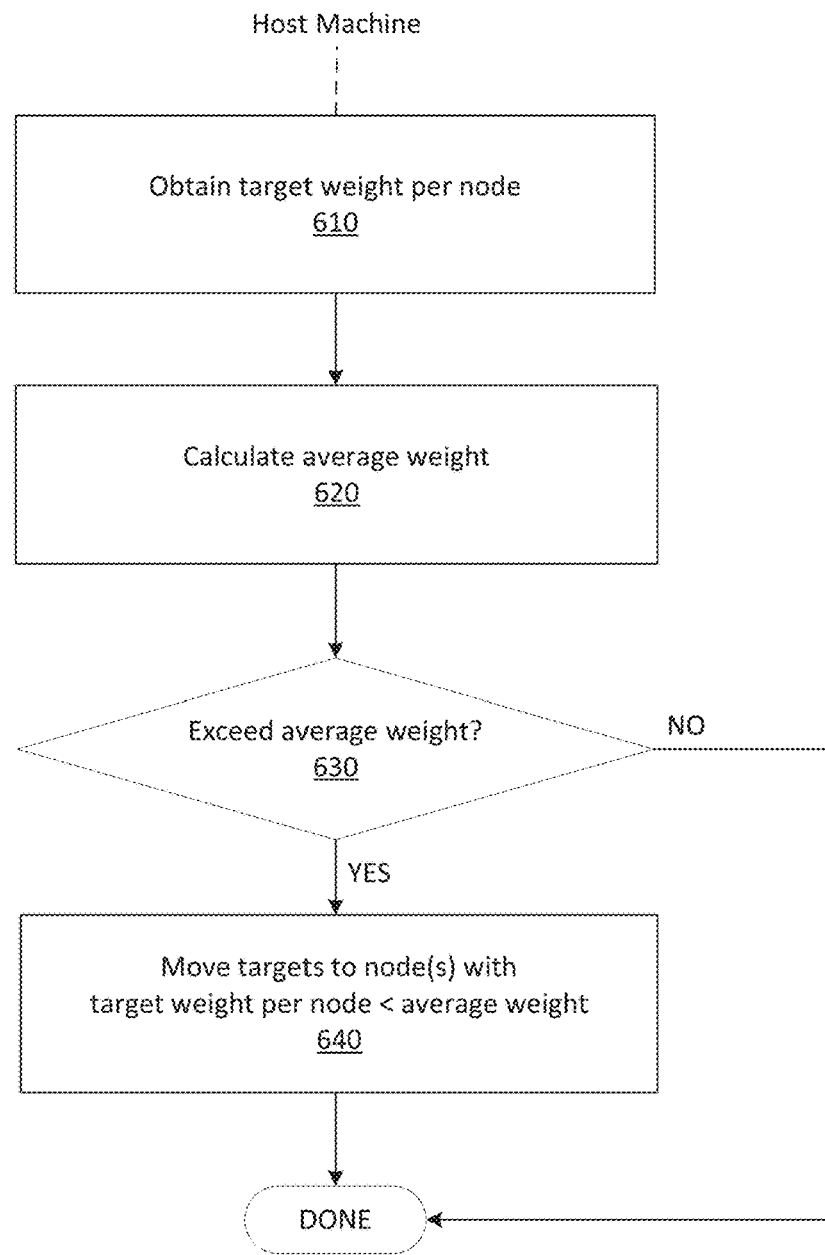
FIG. 6 illustrates a flowchart of an example process for a load balancing algorithm, in accordance with some embodiments of the present disclosure

FIG. 6 illustrates a flowchart of example process 600 for a load balancing algorithm, in accordance with some embodiments of the present disclosure. Example process 600 may include one or more operations, functions, or actions illustrated by one or more blocks, such as 610 to 640. The various blocks may be combined into fewer blocks, divided into additional blocks, and/or eliminated depending on the desired implementation.

In some embodiments, process 600 may be applied at block 525 and 540 of FIG. 5 to meet the first and the second balance objectives. Process 600 may utilize the following two equations to calculate average weights:

$$\text{average weight in-site} = \text{total object weight in-site} / \text{host count in-site} \quad \text{Equation 1:}$$

average weight in-cluster=total object weight in-cluster/host count in-cluster   Equation 2:

For example, the "total object weight in-site" may refer to the total number of LUNs in an affinity site, and the "host count in-site" may refer to the number of host machines in the same affinity site. Similarly, the "total object weight in-cluster" may refer to the total number of LUNs in a cluster, and the "host count in-cluster" may refer to the number of host machines in the same cluster.

These averages, along with the mappings between the nodes and targets determined in process 500, are used in the algorithm to determine how the workload can be distributed among the host machines in a site (e.g., affinity site) or a cluster.

In particular, at block 610, a host machine obtains the target weight (e.g., the number of targets) owned by each node. If process 600 is invoked after block 520 of FIG. 5, then the number obtained here is for the number of affinity targets owned by each node in an affinity site. On the other hand, if process 600 is invoked after block 535, then the number obtained here is for the number of targets owned by each node in a cluster.

At block 620, the average weight is calculated based on either Equation 1 or Equation 2 above.

At block 630, the host machine determines whether the number of its owned targets exceeds the average weight. If so, then process 600 proceeds to block 640. Otherwise, process 600 terminates.

At block 640, the host machine identifies other host machines in the site or in the cluster that each owns less target weight (e.g., fewer targets) than the average weight and moves some of its owned targets to such identified host machines.

To further demonstrate how process 600 works, FIGS. 7A, 7B, 7C, and 7D illustrate various stages of load balancing in a cluster with an affinity site, in accordance with some embodiments of the present disclosure.

Figure 7A:
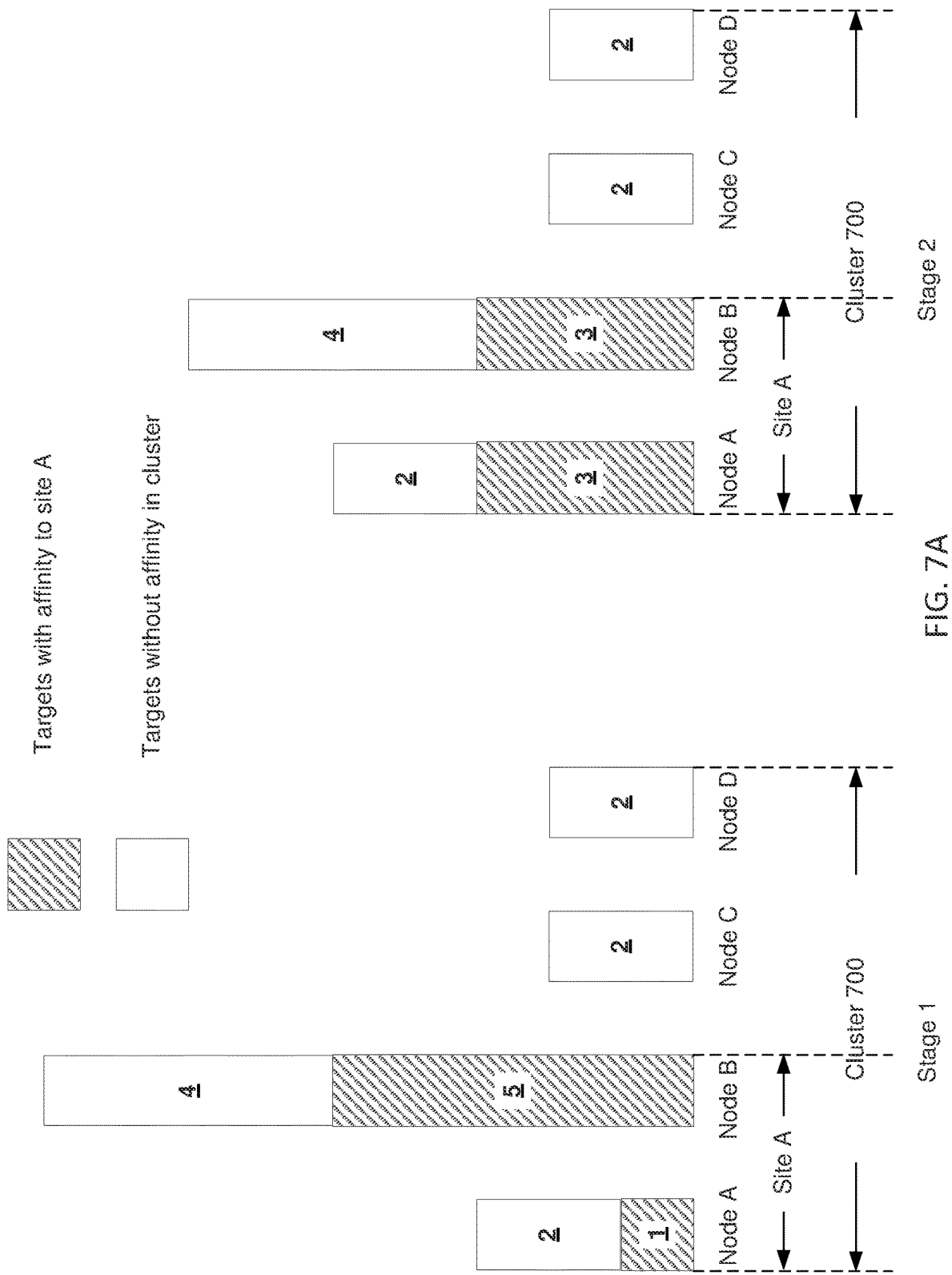
FIG. 7A illustrates stage 1 with an imbalanced target count distribution in an example cluster with an affinity site and stage 2 with a balanced target count distribution in the affinity site, in accordance with some examples of the present disclosure.

FIG. 7A illustrates stage 1 with an imbalanced target count distribution in an example cluster 700 with affinity site A. Specifically, cluster 700 has four host machines or nodes, node A, node B, node C, and node D. As shown, node A and node B belong to affinity site A. Node A has 1 affinity target, while node B has 5 affinity targets. Using Equation 1 above, the average weight in-site=(1+5)/2=3. Since node B has 2 more affinity targets than the average weight, node B moves the 2 affinity targets to node A.

FIG. 7A also illustrates stage 2 with a balanced affinity target count distribution in site A. Specifically, after the move made by node B, node A and node B each has 3 affinity targets.

After the even distribution of affinity targets between the two nodes in site A, the load balancing process proceeds to the targets owned by the other nodes in the cluster (e.g., block 530 of FIG. 5). Continuing with stage 2 in FIG. 7A, node A has 5 targets. 3 out the 5 targets are affinity targets. Node B has 7 targets. 3 out of the 7 targets are affinity targets. Node C and node D each has 2 targets. Using Equation 2 above, the average weight in-cluster=(5+7+2+2)/4=4. Since node B has the maximum number of targets in the cluster, and 7 exceeds the average weight in-cluster by 3, node B moves 3 targets without affinity to node C and node D.

Figure 7B:
FIG. 7B illustrates stage 3 with a rebalanced node from the cluster level and stage 4 with a balanced target count distribution in the cluster, in accordance with in some examples of the present disclosure.

FIG. 7B illustrates stage 3 with a rebalanced node B from the cluster level. Here, node A has 5 targets, with 3 affinity targets. To balance workload at the cluster level, node A moves 1 target without affinity to node C.

In stage 4, all nodes in cluster 700 own an equal number of targets, i.e., 4 targets, showing a balanced target count distribution in cluster 700.

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 7B.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method to support Internet small computer system interface (iSCSI) services in a distributed storage system of a virtualization system, the method comprising:
   receiving, by a first host machine in a cluster of host machines that support the virtualization system, a notification of a change event associated with a global virtual Internet Protocol (VIP) object, wherein the global VIP object is associated with a virtual IP address for the iSCSI services;
   in response to a first determination that the first host machine does not own the global VIP object and in response to a second determination that the first host machine gains ownership of the global VIP object based on the notification, locking, by the first host machine, the global VIP object, binding, by the first host machine, the virtual IP address to the first host machine and, after the global VIP object is locked and the virtual IP address is bounded to the first host machine, providing, by the first host machine, information associated with an iSCSI target for an initiator to access the iSCSI target in the distributed storage system through iSCSI-based Input/Output operations; and
   in response to a third determination that the first host machine owns the global VIP object, and in response to a fourth determination that the first host machine loses ownership of the global VIP object, unbinding, by the first host machine, the virtual IP address from the first host machine and unlocking, by the first host machine, the global VIP object.

2. The method of claim 1, wherein prior to locking the global VIP object and binding the virtual IP address to the first host machine, waiting for the virtual IP address to be available and the global VIP object to be unlocked.

3. The method of claim 2, wherein the virtual IP address is available when a current owner of the global VIP object in the cluster has unbound virtual IP address from the current owner.

4. The method of claim 1, wherein determining whether the first host machine owns the global VIP object comprises communicating with a common data service for the cluster of host machines.

5. The method of claim 4, further comprising:
   after locking the global VIP object and binding the virtual IP address to the first host machine, communicating, by the first host machine, the first host machine's ownership of the global VIP object to the common data service.

6. The method of claim 1, wherein the global VIP object is a high-level namespace object unique in the cluster.

7. The method of claim 1, further comprising:
   registering callback information associated with the global VIP object with a common data service, which generates the notification of the change event.

8. A non-transitory computer-readable storage medium that includes a set of instructions which, in response to execution by a processor of a first host machine, cause the processor to perform a method to support Internet small computer system interface (iSCSI) services in a distributed storage system of a virtualization system, the method comprising:
   receiving, by the first host machine in a cluster of host machines that support the virtualization system, a notification of a change event associated with a global virtual Internet Protocol (VIP) object, wherein the global VIP object is associated with a virtual IP address for the iSCSI services;
   in response to a first determination that the first host machine does not own the global VIP object and in response to a second determination that the first host machine gains ownership of the global VIP object based on the notification, locking, by the first host machine, the global VIP object, binding, by the first host machine, the virtual IP address to the first host machine and, after the global VIP object is locked and the virtual IP address is bounded to the first host machine, providing, by the first host machine, information associated with an iSCSI target for an initiator to access the iSCSI target in the distributed storage system through iSCSI-based Input/Output operations; and
   in response to a third determination that the first host machine owns the global VIP object, and in response to a fourth determination that the first host machine loses ownership of the global VIP object, unbinding, by the first host machine, the virtual IP address from the first host machine and unlocking, by the first host machine, the global VIP object.

9. The non-transitory computer-readable storage medium of claim 8, wherein prior to locking the global VIP object and binding the virtual IP address to the first host machine, waiting for the virtual IP address to be available and the global VIP object to be unlocked.

10. The non-transitory computer-readable storage medium of claim 9, wherein the virtual IP address is available when a current owner of the global VIP object in the cluster has unbound virtual IP address from the current owner.

11. The non-transitory computer-readable storage medium of claim 8, wherein determining whether the first host machine owns the global VIP object comprises communicating with a common data service for the cluster of host machines.

12. The non-transitory computer-readable storage medium of claim 11, wherein the method further comprises:
   after locking the global VIP object and binding the virtual IP address to the first host machine, communicating, by the first host machine, the first host machine's ownership of the global VIP object to the common data service.

13. The non-transitory computer-readable storage medium of claim 8, wherein the global VIP object is a high-level namespace object unique in the cluster.

14. The non-transitory computer-readable storage medium of claim 8, wherein the method further comprises:
   registering callback information associated with the global VIP object with a common data service, which generates the notification of the change event.

15. A first host machine in a cluster of host machines that supports a virtualization system, comprising:
   a processor; and
   a non-transitory computer-readable medium having stored thereon instructions that, when executed by the processor, cause the processor to:
   receive a notification of a change event associated with a global virtual Internet Protocol (VIP) object, wherein the global VIP object is associated with a virtual IP address for Internet small computer system interface (iSCSI) services in a distributed storage system of the virtualization system;

in response to a first determination that the first host machine does not own the global VIP object and in response to a second determination that the first host machine gains ownership of the global VIP object based on the notification, lock the global VIP object, bind the virtual IP address to the first host machine and, after the global VIP object is locked and the virtual IP address is bounded to the first host machine, providing information associated with an iSCSI target for an initiator to access the iSCSI target in the distributed storage system through iSCSI-based Input/Output operations; and in response to a third determination that the first host machine owns the global VIP object, and in response to a fourth determination that the first host machine loses ownership of the global VIP object, unbind the virtual IP address from the first host machine and unlock the global VIP object.

16. The first host machine of claim 15, wherein prior to locking the global VIP object and binding the virtual IP address to the first host machine, the first host machine is configured to wait for the virtual IP address to be available and the global VIP object to be unlocked.

17. The first host machine of claim 16, wherein the virtual IP address is available when a current owner of the global VIP object in the cluster has unbound virtual IP address from the current owner.

18. The first host machine of claim 15, wherein the first host machine is configured to determine whether the first host machine owns the global VIP object by communicating with a common data service for the cluster of host machines.

19. The first host machine of claim 18, wherein the first host machine is configured to further:
   after locking the global VIP object and binding the virtual IP address to the first host machine, communicate the first host machine's ownership of the global VIP object to the common data service.

20. The first host machine of claim 15, wherein the global VIP object is a high-level namespace object unique in the cluster.

21. The first host machine of claim 15, wherein the first host machine is further configured to:
   register callback information associated with the global VIP object with a common data service, which generates the notification of the change event.

* * * * *